Dec. 19, 1933.  E. V. TAYLOR  1,940,468
BRAKE
Filed Sept. 7, 1929    2 Sheets-Sheet 1

INVENTOR.
Eugene V. Taylor
BY H. O. Clayton
ATTORNEY.

Dec. 19, 1933.   E. V. TAYLOR   1,940,468
BRAKE
Filed Sept. 7, 1929   2 Sheets-Sheet 2

INVENTOR.
Eugene V. Taylor
BY H. O. Clayton
ATTORNEY

Patented Dec. 19, 1933

1,940,468

UNITED STATES PATENT OFFICE 1,940,468

BRAKE

Eugene V. Taylor, Chicago, Ill., assignor to Bendix Brake Company, South Bend, Ind., a corporation of Illinois Application September 7, 1929. Serial No. 390,868

5 Claims. (Cl. 188—152)

This invention relates to brakes and is illustrated as embodied in an internal expanding type of automotive brake.

An object of the invention is to provide a very simple and yet efficient type of applying means for the friction elements of the brake and, in the embodiments of my invention disclosed, there is disclosed a common means for applying equal pressures to two cam devices adapted to render operative the friction elements, and which devices have fixed mountings, each acting on its adjacent end of the friction means.

According to one embodiment of the applying means, two separate and distinct cams are mounted on a common support, each contacting with one end of a contiguous friction element and both adapted to be angularly actuated by a fluid, said fluid supplied from a common source. The cams are preferably each keyed to a separate shaft, which shafts also support gear members, the fluid from the common source impinging upon the teeth of the respective gears.

According to a second embodiment of my invention, two separate cam members contacting with their respective friction elements of the brake are adapted to be individually connected with a common pressure equalizing bar, the latter being bodily movable by transmission linkage to the respective service pedal, said bar balancing the forces transmitted from the cams.

The above and other objects and features of the invention, including specific novel details of construction and combinations of parts, will become apparent from the detailed explanation of the embodiments disclosed in the drawings, in which.

Figure 1:
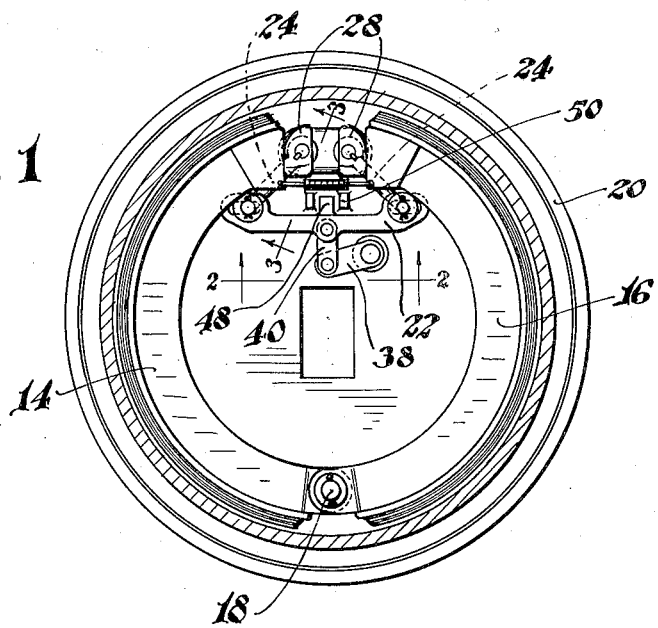
Figure 1 is a view in side elevation of one form of brake employing my novel actuator.
Figure 2:
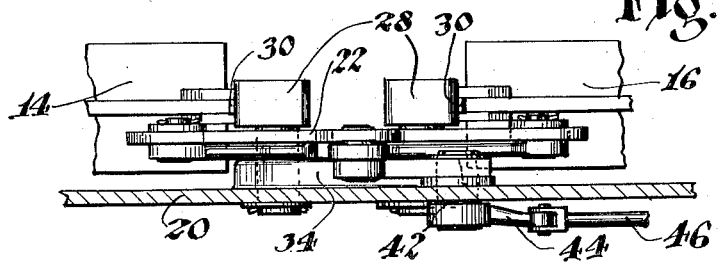
Figure 2 is a partial bottom plan view of the actuating mechanism of Figure 1 looking in the direction of the arrows on the line 2—2 thereof.
Figure 3:
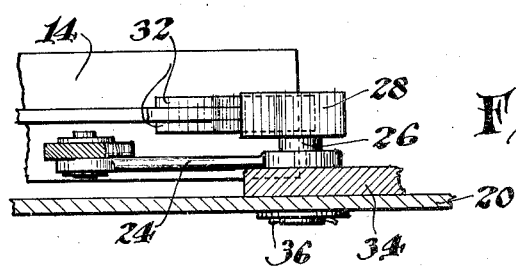
Figure 3 is a section taken through the actuator of Figure 1 on the line 3—3 thereof.

In that embodiment of my invention disclosed in Figures 1 to 3, inclusive, I have disclosed an internal expanding type of brake, preferably comprising two shoes, 14 and 16, pivotally mounted on an anchor pivot 18 fixedly secured to the backing or support plate 20 of the brake. The important feature of the invention resides in the novel actuating means for the shoes 14 and 16, which preferably comprises a horizontally extending equalizing link 22 having inclined thrust links 24 pivotally mounted in slots in the enlarged ends thereof, which links may be keyed to cam shafts 26, which shafts may have keyed thereto the shoe operating cams 28. Each of cams 28, shaped as half disks, is preferably provided with a rib 30 on its curved or applying side, which rib is adapted to fit within a slot in the end of its contiguous brake shoe, the slot being formed by extending parallel reinforcing and cam follower stampings 32 which are preferably projection welded on each side of the web of the shoe.

A reinforcing plate 34 may be provided between the ends of the arms secured to the cam shaft and the backing plate, as disclosed in Figure 3, the cam shaft continuing through said plate and backing plate and secured thereto by cotter pins 36 as disclosed. The equalizing lever bar 22 is adapted to be moved upwardly to rotate the thrust links 24 by means of a crank arm 38 pivotally secured to a thrust link 40 pivoted to the center of the equalizing bar, the crank arm being secured to a shaft 42 journaled in the support plate and rotated by means of a crank arm 44 pivotally secured to transmission linkage 46 such as the usual brake hookup. The equalizing bar 22 is further provided at its center with a post 48 adapted to contact stops 50 integrally or otherwise fixedly secured to the backing plate.

In operation actuation of the crank arm 38 from the service pedal connections serves to move the bar 22 upwardly, which in turn rotates the arms 24 to effect clockwise and counterclockwise rotation to the respective cams. The stops 50 serve to guide the movement of the bar during this upward movement. By virtue of the floating nature of the bar with respect to the crank arm 38, thrust links 40, and the slotted connection with the arms 24, there is provided equalized or balanced applying forces to the respective ends of the brake shoes. This equality of force to the respective ends of the shoes is the desideratum in this type of brake, in that with either direction of drum rotation there is effected equal braking.

Figure 4:
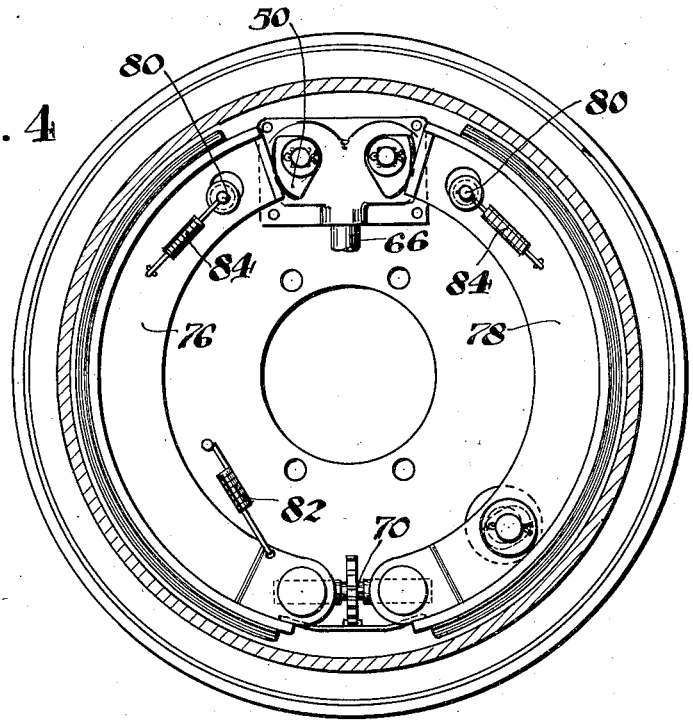
Figure 4 is a view generally similar to Figure 1 showing in elevation a somewhat different type of brake with a hydraulic motor type of actuator.
Figure 5:
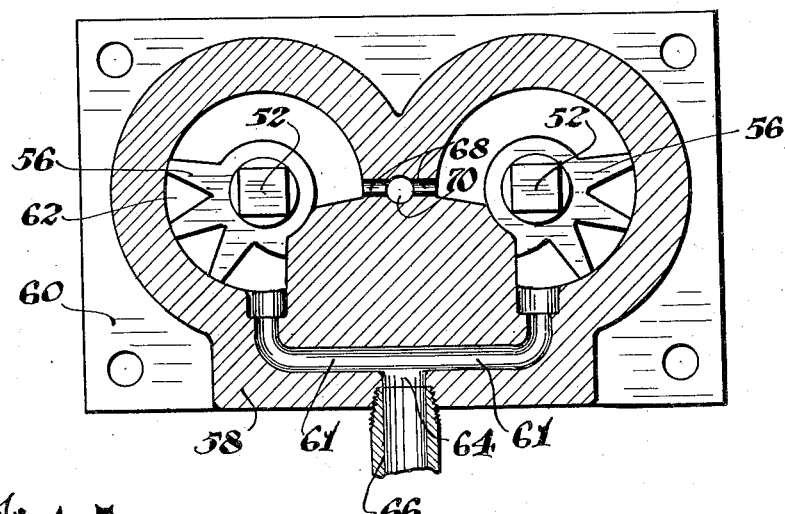
Figure 5 is a section taken on the line 5—5 of Figure 1 showing in more detail the structure of the actuator of Figure 4.

In the embodiment of my invention disclosed in Figures 4 and 5, separate cams are again provided for each brake shoe, which cams are interchangeable and are each fixedly mounted and actuated by equal forces similar in general to the operation as disclosed in the aforementioned embodiment. With this construction, cams 50 are preferably non-rotatably mounted on the square-sectioned ends of cam shafts 52, each of the latter having an interrupted type of gear 56 mounted on its square-sectioned inner ends. The gears 56 rotate within cylindrical openings in a relatively narrow fluid containing cylinder 58 interposed between the ends of the brake shoes and the backing plate being fixedly secured by bracket portions 60 to the latter. The fluid reservoirs in which the gears are mounted are preferably interconnected by ducts 61, which ducts preferably meet at their centers in a common duct 64 to which a supply pipe 66 may be attached. As may be clearly seen in Figures 4 and 5, the bracket portions 60, the cylinders 58, the gears 56, the shafts 52, and the cams 50 mounted on the shafts 52 constitute a separate subassembly unit operable for applying the brakes and adapted to be mounted on the backing plate adjacent to the ends of the friction element, and if desired to be removed from the wheel as a unit.

In operation, a suitable fluid such as air or liquid and under pressure is adapted to pass through the ducts 61 impinging upon the sides of the lowermost tooth of each of the gears to rotate the same, thereby actuating the cams in opposite directions to apply the brake shoes. Any loss of fluid by leakage past the teeth of the gear passes into ducts 68 and thence into a common outlet port conducted back to the line or to the fluid reservoir. All parts of the operating mechanism being symmetrical with respect to a vertical line through the center of the brake, it is obvious that due to the inherent equalization of pressure to the respective cams, equal forces will be applied to the respective shoes.

With this type of actuator a two-shoe brake of the full-wrapping or duo-servo type is used having an adjustable floating joint 70 more fully described in the application of Vincent Bendix, No. 159,806 filed January 8th, 1927. The shoes 76 and 78 of the brake are adapted to be anchored on one or the other of the fixed anchorages 80 depending upon the direction of drum rotation. Return springs 82 and 84 serve to return the brake to an inoperative position within the brake drum upon release of the fluid pressure.

I have thus provided in the two embodiments disclosed and described two separate and distinct symmetrically arranged cams each actuating its respective brake shoe, each cam being fixedly mounted and rotatable by means applying equal or balanced forces to the respective cams.

While two illustrative embodiments of the invention have been described in detail, it is not my intention to limit the invention to those particular embodiments or otherwise than by the terms of the appended claims.

I claim:

1. A brake comprising, in combination, a rotatable drum and friction elements within said drum having spaced apart ends and means for applying said friction elements into drum contact, said means positioned between said ends, said means comprising two symmetrically positioned and oppositely movable cams, each contacting with its respective friction element, and means for rotating said cams comprising a fluid under pressure, a pair of gears upon which said fluid impinges, and a pair of separate shafts each having one of the gears keyed upon an end thereof and each supporting one of the cams.

2. A brake comprising, in combination, a rotatable drum and friction elements within said drum having spaced apart ends and means for applying said friction elements into drum contact, said means positioned between said ends, said means comprising two symmetrically positioned and oppositely movable cams, each contacting with its respective friction element and means for rotating said cams comprising a fluid under pressure, a pair of gears upon which said fluid impinges, a pair of separate shafts each having one of the gears keyed thereto and each supporting one of the cams, and a pair of fluid cylinders each having one of the gears lying therein and both positioned between the ends of said friction elements.

3. Applying means for an internal expanding brake comprising, in combination, interchangeable cams symmetrically disposed with respect to the vertical center line of the brake, each of said cams adapted to be rotated in opposite directions to apply elements of the brake by means of a fluid under pressure, gear members having teeth upon which said fluid impinges, and means for rotating said cams connected to said gear members.

4. Applying means for an internal expanding brake comprising, in combination, interchangeable cams symmetrically disposed with respect to the vertical center line of the brake, each of said cams adapted to be rotated in opposite directions to apply elements of the brake by means of a fluid under pressure, gear members having teeth upon which the fluid impinges, a single fluid motor having separate recesses in which said gear members are housed, and means for rotating said cams connected to said gear members and housed within the recesses of the motor.

5. In a brake mechanism of the class described, applying means in two separate parts adapted to apply equal forces and means for rotating said parts comprising an interrupted gear for each part, said gears mounted for angular movement in a common mounting and adapted to be rotated at equal rates by fluid under pressure from a common source immediately adjacent said gears.

EUGENE V. TAYLOR.